April 5, 1932. W. H. MERCIER 1,852,356
HOT WATER DRIPPER
Filed Oct. 4, 1930
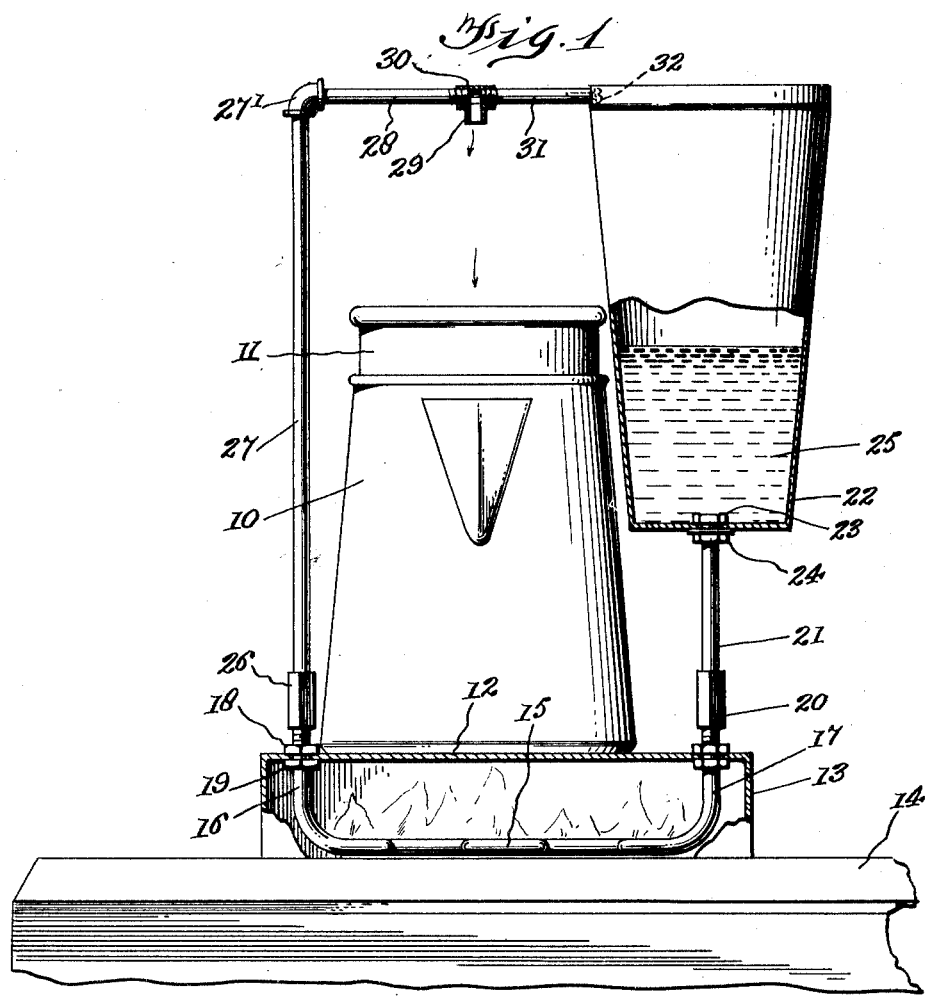
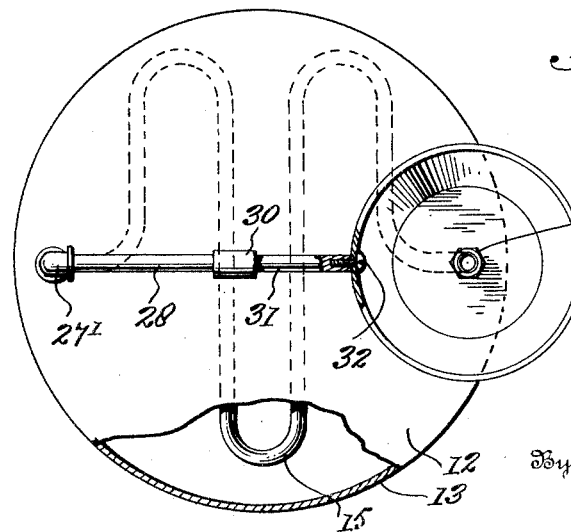
Inventor
W. H. Mercier
By Wilkinson & Mawhinney
Attorneys Patented Apr. 5, 1932

1,852,356

UNITED STATES PATENT OFFICE

WALTER H. MERCIER, OF BATON ROUGE, LOUISIANA

HOT WATER DRIPPER

Application filed October 4, 1930. Serial No. 486,456.

The present invention relates to improvements in hot water drippers and has for an object to provide an improved device primarily employed for the purpose of making dripped coffee, in which accurate amounts of coffee may be made with considerable saving of fuel.

Another object of the invention is to provide an improved coffee dripping device in which no valves are employed or necessary, and in which the construction and operation are simple and effective.

A further object of the invention is to provide an improved coffee dripper, in which a coil is employed for heating the water in combination with a support for the coffee pot and a hot water outlet above such coffee pot.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a front elevation, with parts broken away and parts shown in section, illustrating an improved device constructed according to the present invention, and Figure 2 is a top plan view, with parts broken away and parts shown in section.

Referring more particularly to the drawings, 10 designates particularly a coffee pot or coffee receptacle, having the usual means 11 in its upper portion for holding the coffee or other material, from which is to be extracted the beverage.

In accordance with the present invention, this coffee pot is adapted to be placed on a platform or support 12 having a marginal downwardly extending flange or support 13 for resting upon a stove or burner 14, so that the flame from the burner will come in contact with the coil 15, which is contained within the enclosed space circumscribed by the flange 13 and platform 12.

The lower part of this enclosed space is, of course, open to permit of access to the coil by the flames indicated in Figure 1.

The ends 16 and 17 of the coil are employed as supports for the coil, and these ends extend up through the platform 12 and are preferably threaded to receive pairs of lock nuts 18 and 19 which are clamped against the upper and lower surfaces of the platform 12, whereby to hold the coil 15 in place. Other means might be employed for securing this result. A collar 20 is screw threaded or otherwise secured to the upwardly projecting pipe end 17 and forms a coupling or connection to a riser pipe 21, which extends through the bottom of the water container 22. Lock nuts 23 and 24 may be provided upon this pipe 21 above and below the bottom of the container 22 in order to assist in supporting the container, which is adapted to hold the body of water 25 of suitable mass.

The other coil end 16 extends up through the platform and receives a collar 26, to which the lower end of a stand pipe 27 is affixed. This stand pipe is shown as provided with an elbow 27' at its upper end, by which connection is made to the horizontal pipe 28 having the downwardly extending nozzle or hot water outlet 29. This nozzle 29 may be conveniently formed in a T 30, the lower branch of which forms the nozzle 29, while a second branch screw threadedly or otherwise engages the horizontal pipe 28.

A third branch of the T 30 receives the threaded or otherwise equipped end of a solid rod 31, which may be secured as by a screw 32 to the open rim of the receptacle or the water container 22.

In the use of the device, any desired coffee pot 10 used for dripping coffee is loaded and placed on top of the base 12, substantially as indicated in Figure 1, where the open top of the coffee pot will be beneath the hot water outlet 29. The metal container 22 is filled with an amount of cold water that is desired as coffee when dripped, namely, if two cups of coffee are wanted, two cups of cold water are put into the water container 22. The device is now placed directly over a slow fire, for instance, a gas stove, electric stove, etc., and in approximately thirty seconds, boiling water will begin to drip into the ground coffee and continue to do so until the water supply has been consumed. The rate of drip may be regulated by increasing or decreasing the fire.

When the water in the coil 15 is heated sufficiently, expansion takes place, forcing the water in the heated coil 15 in both directions, that is, toward the hot water outlet 29 and toward the cold water container 22. As the boiling water comes in contact with the cold water in the container 22 condensation takes place and causes a differential in pressure between the hot and the cold side of the dripper, which in turn causes the boiling water to drip out of the hot water outlet 29.

As the boiling water is forced out of the coil 15, the pressure in the coil is released, allowing cold water to again enter the coil; and the operation continues until the cold water supply is used up.

It will be appreciated that in the use of the invention, a short time interval only is required to obtain boiling water and to start the dripping operation; that no attention is necessary after the operation is started; that properly dripped coffee is had due to the small amount of boiling water constantly passing through the coffee grounds; that due to the low fire required and the space between the bottom of the coffee pot and fire, the dripped coffee will never be heated to the boiling point, but will remain hot; that a measured amount of finished coffee can be obtained by using this same quantity in the water container 22; that the dripper can be operated in conjunction with any kind of fire or heating unit that will boil water; that no check valves or other controls are necessary to the operation of the dripper; and that the improved dripper has the advantages of simplicity and durability.

It will be obvious that various changes in the construction, combination and arrangement of parts could be made, which could be used without departing from the spirit of my invention, and I do not mean to limit the invention to such details, except as particularly pointed out in the claim.

Having thus described my invention, what I claim and desire to secure by Letters Patent of the United States is:—

A portable hot water dripper for use with coffee pots and the like, comprising a hollow support open at its bottom and having a flat upper surface for supporting a coffee pot and adapted to be placed over a source of heat, a pipe coil mounted in the hollow support, a riser pipe connected to one end of the coil and extending upwardly from the support near one side thereof, a water container mounted on the upper end of the riser pipe and opening into the same, a stand pipe connected to the other end of the coil and extending upwardly from the support near the opposite side thereof, a horizontal pipe connected to the upper end of the stand pipe and overhanging said flat surface for the coffee pot, a nozzle on the horizontal pipe opening downwardly over said flat surface to direct hot water into a coffee pot, and a brace rod between the nozzle and the upper end of the water container.

WALTER H. MERCIER.